(12) United States Patent  (10) Patent No.: US 8,302,912 B2
Wood  (45) Date of Patent: Nov. 6, 2012

(54) SHOCK BUMP

(75) Inventor: Norman Wood, Bristol (GB)

(73) Assignee: Airbus Operations Limited, Bristol (GB)

( * ) Notice: Subject to any disclaimer, the term of this patent is extended or adjusted under 35 U.S.C. 154(b) by 25 days.

(21) Appl. No.: 12/735,540

(22) PCT Filed: Feb. 17, 2009

(86) PCT No.: PCT/GB2009/050151
§ 371 (c)(1),
(2), (4) Date: Jul. 26, 2010

(87) PCT Pub. No.: WO2009/106870
PCT Pub. Date: Sep. 3, 2009

(65) Prior Publication Data
US 2010/0314500 A1 Dec. 16, 2010

(30) Foreign Application Priority Data
Feb. 29, 2008 (GB) .................................. 0803722.8

(51) Int. Cl.
B64C 21/10 (2006.01)
B64C 30/00 (2006.01)
(52) U.S. Cl. ..................... 244/200.1; 244/130; 244/200; 244/198; 244/35 A
(58) Field of Classification Search ................... 244/200, 244/200.1, 198, 130, 35 A
See application file for complete search history.

(56) References Cited

U.S. PATENT DOCUMENTS

| 2,532,753 | A | * | 12/1950 | Beman | 244/198 |
| 2,800,291 | A | * | 7/1957 | Stephens | 244/200 |
| 2,898,059 | A | * | 8/1959 | Whitcomb | 244/130 |
| 3,578,264 | A | * | 5/1971 | Kuethe | 244/200.1 |
| 4,067,518 | A | | 1/1978 | Paterson et al. | |
| 4,354,648 | A | * | 10/1982 | Schenk et al. | 244/200.1 |
| 4,643,376 | A | | 2/1987 | Vanderhoeven | |
| 5,058,837 | A | * | 10/1991 | Wheeler | 244/200.1 |
| 5,433,404 | A | * | 7/1995 | Ashill et al. | 244/200 |
| 5,692,709 | A | * | 12/1997 | Mihora et al. | 244/204 |
| 6,929,214 | B2 | * | 8/2005 | Ackleson et al. | 244/1 R |
| 7,118,071 | B2 | * | 10/2006 | Bogue | 244/130 |
| 7,784,737 | B2 | * | 8/2010 | Lee et al. | 244/129.1 |
| 8,016,245 | B2 | | 9/2011 | Hassan et al. | |
| 2006/0021560 | A1 | * | 2/2006 | McMillan et al. | 244/130 |

(Continued)

FOREIGN PATENT DOCUMENTS

GB 1 281 899 7/1972

(Continued)

OTHER PUBLICATIONS

International Search Report for PCT/GB2009/050150, mailed Aug. 20, 2009.

(Continued)

Primary Examiner — Michael Carone
Assistant Examiner — Steven Hawk
(74) Attorney, Agent, or Firm — Nixon & Vanderhye P.C.

(57) ABSTRACT

A shock bump (10) comprising a diverging nose (20) and a converging tail. The tail has at least one plan-form contour line with a pair of concave opposite sides (22, 23). The shock bump provides an improved shape with relatively low drag. Furthermore, the concave shape of the tail tends to promote the development of longitudinal vortices which can reduce shock induced buffet at certain operating conditions.

15 Claims, 4 Drawing Sheets

U.S. PATENT DOCUMENTS

| | | |
|---|---|---|
| 2006/0060720 A1 | 3/2006 | Bogue |
| 2007/0018055 A1 | 1/2007 | Schmidt |
| 2009/0084906 A1 | 4/2009 | Hassan et al. |
| 2009/0294596 A1* | 12/2009 | Sinha et al. .................. 244/200 |

FOREIGN PATENT DOCUMENTS

| | | |
|---|---|---|
| GB | 2 296 696 | 7/1996 |
| WO | WO 00/01578 | 1/2000 |
| WO | WO 2005/032938 | 4/2005 |

OTHER PUBLICATIONS

Written Opinion of the International Searching Authority for PCT/GB2009/050150, mailed Aug. 20, 2009.
UK Search Report for GB 0803727.7, dated Apr. 27, 2008.
Holden, et al., "Shock/Boundary Layer Interaction Control Using 3D Devices", 41$^{st}$ AIAA Aerospace Sciences Meeting and Exhibit, vol. 41$^{st}$, No. Paper 2003-0447, (Jan. 6, 2003), pp. 1-8.
Ogawa et al., "Shock/Boundary-Layer Interaction Control Using Three-Dimensional Bumps for Transonic Wings", Collection of Technical Papers, vol. AIAA 2007-324, (Jan. 8, 2007), pp. 1-23.
Dargel, G. et al., "21 Assessment of Shock and Boundary Layer Control Concepts for Hybrid Laminar Flow Wing Design", Drag Reduction by Shock and Boundary Layer Control. Results of the Project Euroshock II, Supported by the EP Union 1996-1999, vol. 80, (Jan. 1, 2002), pp. 383-414.
Milholen, W.E. II et al., "On the Application of Contour Bumps for Transonic Drag Reduction (Invited)", American Institute of Aeronautics and Astronautics 2005-0462, pp. 1-19.
U.S. Appl. No. 12/735,535, filed Jul. 26, 2010, Wood.
U.S. Appl. No. 12/735,541, filed Jul. 26, 2010, Wood.
U.S. Appl. No. 12/735,536, filed Jul. 26, 2010, Wood.
U.S. Appl. No. 12/735,534, filed Jul. 26, 2010, Wood.
International Search Report and Written Opinion of the International Searching Authority for PCT/GB2009/050152, mailed Aug. 20, 2009.
UK Search Report for GB 0803724.4, dated Apr. 27, 2008.
International Search Report and Written Opinion of the International Searching Authority for PCT/GB2009/050153, mailed Aug. 20, 2009.
UK Search Report for GB 0803719.4, dated Apr. 27, 2008.
International Search Report and Written Opinion of the International Searching Authority for PCT/GB2009/050154, mailed Aug. 20, 2009.
UK Search Report for GB 0803730.1, dated Jun. 23, 2008.
Birkmeyer et al., "Shock control on a swept wing", Aerospace Science and Technology, vol. 4, No. 3, (Jan. 1, 2000), pp. 147-156.
International Search Report and Written Opinion of the International Searching Authority for PCT/GB2009/050151, mailed Aug. 20, 2009.
UK Search Report for GB 0803722.8, dated Apr. 27, 2008.
Office Action mailed Dec. 22, 2011 in co-pending U.S. Appl. No. 12/735,535.
Office Action mailed Dec. 23, 2011 in co-pending U.S. Appl. No. 12/735,541.
Office Action mailed Dec. 23, 2011 in co-pending U.S. Appl. No. 12/735,536.
Office Action mailed Dec. 22, 2011 in co-pending U.S. Appl. No. 12/735,534.
Office Action mailed Jul. 10, 2012 in co-pending U.S. Appl. No. 12/735,535.
Office Action mailed Jun. 22, 2012 in co-pending U.S. Appl. No. 12/735,541.
Office Action mailed Jul. 3, 2012 in co-pending U.S. Appl. No. 12/735,536.
Office Action mailed Jun. 29, 2012 in co-pending U.S. Appl. No. 12/735,534.

* cited by examiner

SHOCK BUMP

This application is the U.S. national phase of International Application No. PCT/GB2009/050151 filed 17 Feb. 2009, which designated the U.S. and claims priority to GB Application No. 0803722.8 filed 29 Feb. 2008, the entire contents of each of which are hereby incorporated by reference.

FIELD OF THE INVENTION

The present invention relates to a shock bump; and a method of operating an aerodynamic structure comprising a shock bump extending from its surface.

BACKGROUND OF THE INVENTION

When an aircraft operates at a transonic flight speed above its design Mach number there is a tendency for the shock on the wing to strengthen and increase drag. At some point the shock may become sufficiently strong to also generate a flow separation downstream of the shock and this in turn may induce buffet on the wing or control surface. This buffet may range from light to severe and can result in high local dynamic loads, structure-borne noise or degradation of the handling qualities of the aircraft.

This phenomenon of shock induced buffet has been recognised and resolved previously by the application of vane vortex generators (VVGs) ahead of the shock. Such treatment is usually effective but carries with it an associated parasitic drag penalty that is present for operating conditions throughout the flight envelope.

As described in Holden, H. A. and Babinsky, H. (2003) *Shock/boundary layer interaction control using 3D devices* In: 41st Aerospace Sciences Meeting and Exhibit, Jan. 6-9, 2003, Reno, Nev., USA, Paper no. AIAA 2003-447, as a transonic flow passes over a 3-D shock bump the supersonic local conditions induce a smeared shock foot with a lambda-like wave pattern.

US 2006/0060720 uses a shock control protrusion to generate a shock extending away from the lower surface of a wing.

SUMMARY OF THE INVENTION

A first aspect of the invention provides a shock bump comprising a diverging nose and a converging tail, wherein the tail has at least one plan-form contour line with a pair of concave opposite sides.

The shock bump of the first aspect of the invention provides an improved shape with relatively low drag. Furthermore, the concave shape of the tail tends to promote the development of longitudinal vortices which can reduce shock induced buffet in certain operating conditions.

The opposite sides of the plan-form contour line may become convex and meet each other head-on at the trailing edge of the shock bump, or may meet at a cusp-like point.

Typically the shock bump has a leading edge, a trailing edge, an inboard edge and an outboard edge. The bump may merge gradually into the surface at its edges or there may be an abrupt concave discontinuity at one or more of its edges.

Typically the shock bump has substantially no sharp convex edges or points.

A second aspect of the invention provides an aerodynamic structure comprising one or more shock bumps of the type described above extending from its surface. Typically each shock bump is shaped and positioned so as to modify the structure of a shock which would form adjacent to the surface of the structure in the absence of the shock bump(s) when the structure is moved at transonic speeds. This can be contrasted with US 2006/0060720 which uses a shock control protrusion to generate a shock which would not otherwise exist in the absence of the shock control protrusion.

A third aspect of the invention provides a method of operating an aerodynamic structure, the structure comprising a shock bump extending from its surface, the method comprising:
operating the structure at a first condition in which the flow over the shock bump is substantially fully attached; and
operating the structure at a second condition in which a shock forms adjacent to the surface of the aerofoil, the shock bump modifies the structure of the shock, and the flow over the shock bump detaches and forms a pair of longitudinal vortices.

Typically the second condition is one involving a higher flow speed and/or a higher lift coefficient than the first condition.

The structure may comprise an aerofoil such as an aircraft wing, horizontal tail plane or control surface; an aircraft structure such as a nacelle, pylon or fin; or any other kind of aerodynamic structure such as a turbine blade.

In the case of an aerofoil the shock bump may be located on a high pressure surface of the aerofoil (that is, the lower surface in the case of an aircraft wing) but more preferably the surface is a low pressure surface of the aerofoil (that is, the upper surface in the case of an aircraft wing). Also the shock bump typically has an apex which is positioned towards the trailing edge of the aerofoil, in other words it is positioned aft of 50% chord. The apex of the bump may be a single point, or a plateau. In the case of a plateau then the leading edge of the plateau is positioned towards the trailing edge of the aerofoil.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
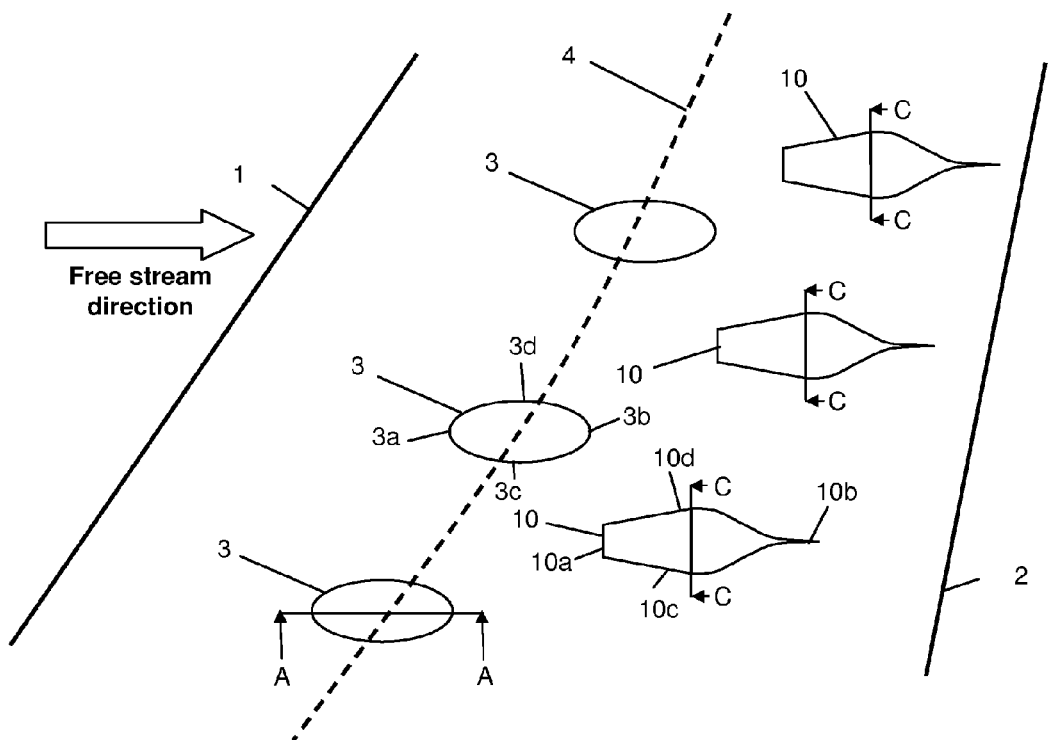
FIG. 1 is a plan view of the top of an aircraft wing carrying an array of shock bumps according to a first embodiment of the invention, operating at its "design" operating condition.

FIG. 1 is a plan view of the upper surface of an aircraft wing. The wing has a leading edge 1 and a trailing edge 2, each swept to the rear relative to the free stream direction.

The upper surface of the wing carries an array of shock bumps extending from its surface. The array comprises a first series of shock bumps 3; and a second series of shock bumps 10 positioned aft of the first series.

Each bump 3, 10 protrudes from a nominal surface 8 of the wing, and meets the nominal surface 8 at a leading edge 3a, 10a; a trailing edge 3b, 10b; an inboard edge 3c, 10c; and an outboard edge 3d, 10d. The lower portions of the sides of bump are concave and merge gradually into the nominal surface 8. For example in FIG. 2 the lower portion 9 of the front side of the bump merges gradually into the nominal surface 8 at leading edge 3a. Alternatively there may be an abrupt discontinuity at one or more of the edges of the bump. For instance the lower portion of the front side of the bump may be planar as illustrated by dashed line 9a. In this case the front side 9a of the shock bump meets the nominal surface 8 with an abrupt discontinuity at the leading edge 3a.

Figure 2:
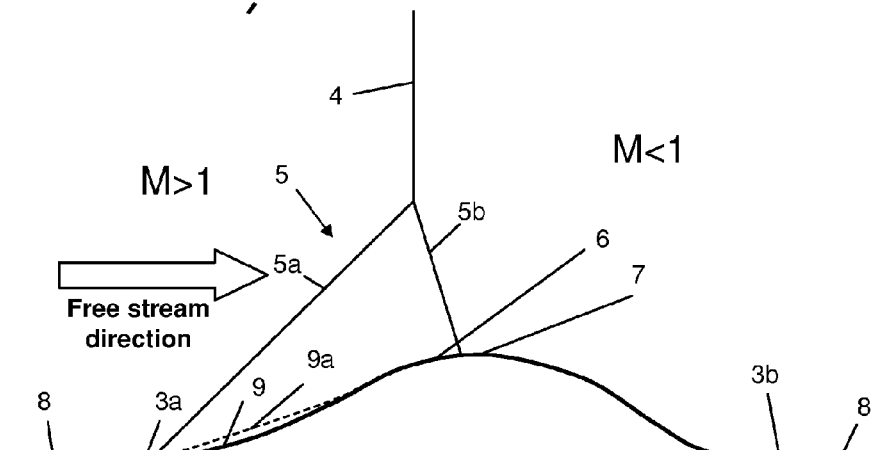
FIG. 2 is a longitudinal cross-sectional view through the centre of one of the bumps taken along a line A-A, with the wing in its "design" operating condition.

FIG. 2 is a cross-sectional view through the centre of one of the bumps 3 taken along a line A-A parallel with the free stream direction. The apex point 7 of the fore/aft cross-section A-A is offset aft of the centre 6 of the bump.

The apex 7 of each bump 3 is positioned aft of 50% chord, typically between 60% and 65% chord.

At transonic speeds a shock forms normal to the upper surface of the wing. FIGS. 1 and 2 show the position 4 of the shock when the aircraft is operated with a Mach number and lift coefficient which together define a "design" operating condition (generally associated with the cruise phase of a flight envelope). At this "design" operating condition the shock bumps 3 are positioned so as to induce a smeared foot 5 in the shock 4 with a lambda like wave pattern as shown in FIG. 2, and the flow over the second series of shock bumps 10 is fully attached.

When the shock bumps 3 are operated at their optimum with the shock 4 just ahead of the apex 7 of the bump as shown in FIG. 2, the smeared foot 5 has a lambda-like wave pattern with a single forward shock 5a towards the leading edge of the bump and a single rear shock 5b positioned slightly forward of the apex 7. Alternatively, instead of having only a single forward shock 5a, the smeared foot may have a lambda-like wave pattern with a fan-like series of forward shocks.

Figure 3:
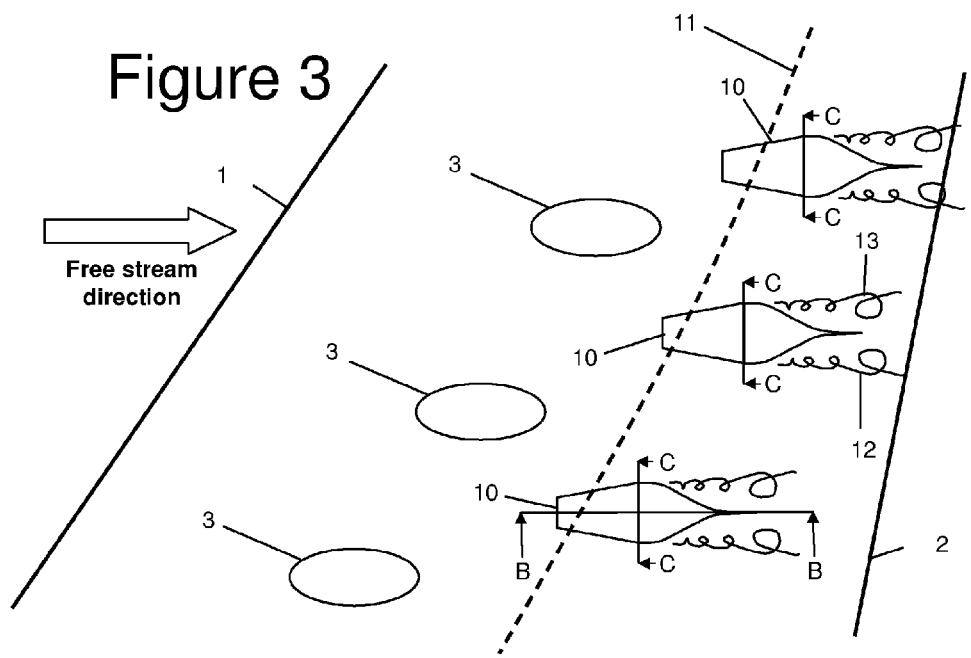
FIG. 3 is a plan view of the top of the aircraft wing of FIG. 1, with the wing in an "off-design" operating condition.
Figure 4:
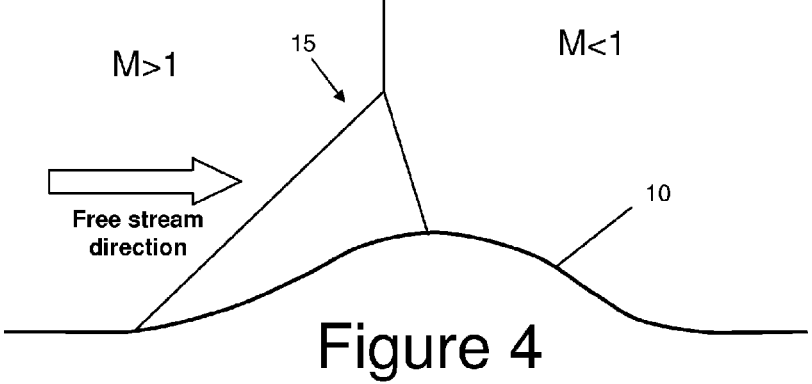
FIG. 4 is a longitudinal cross-sectional view through the centre of one of the bumps taken along a line B-B, with the wing in an "off-design" operating condition.

The second series of shock bumps 10 is positioned to modify the structure of a shock 11 which forms adjacent to the surface of the wing when the aerofoil is operated at a higher Mach number or lift coefficient associated with an "off-design" operating condition as shown in FIGS. 3 and 4. When the lift coefficient or Mach number increases, the shock moves aft to a position 11 shown in FIG. 3, and the shock bumps 10 are positioned so as to induce a smeared shock foot 15 with a lambda like wave pattern as shown in FIG. 4.

Note that, unlike vortex generators, the bumps have no sharp convex edges or points so the flow remains attached over the bumps when they are operated at their optimum (i.e. when the shock is positioned on the bump just ahead of its apex). A characteristic of three-dimensional shock bumps is that when operated away from their optimum i.e. when the shock is positioned on the bump but not just ahead of the apex of the bump, the flow at the rear of the bump tends to detach. This rear bump separation is exploited to form a pair of counter rotating longitudinal vortices 12,13 aligned with the flow direction that will have a similar positive impact on high speed buffet as VVGs. These vortices are embedded in or just above the boundary layer. When operated at normal cruise conditions as shown in FIG. 1 the flow is fully attached and the usual parasitic drag of VVGs is avoided. Hence the shock bumps 10 provide an improved flight envelope and speed range or reduced loads at high speed.

The second series of shock bumps is offset slightly relative to the first series, so that none of the shock bumps 10 in the second series are positioned directly aft of any of the shock bumps 3 in the first series.

Figure 5:
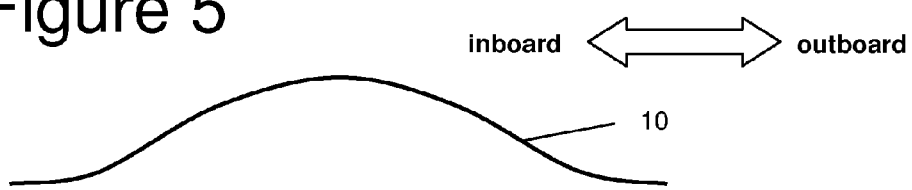
FIG. 5 is a transverse cross-sectional view through the centre of one of the bumps taken along a line C-C.
Figure 6:
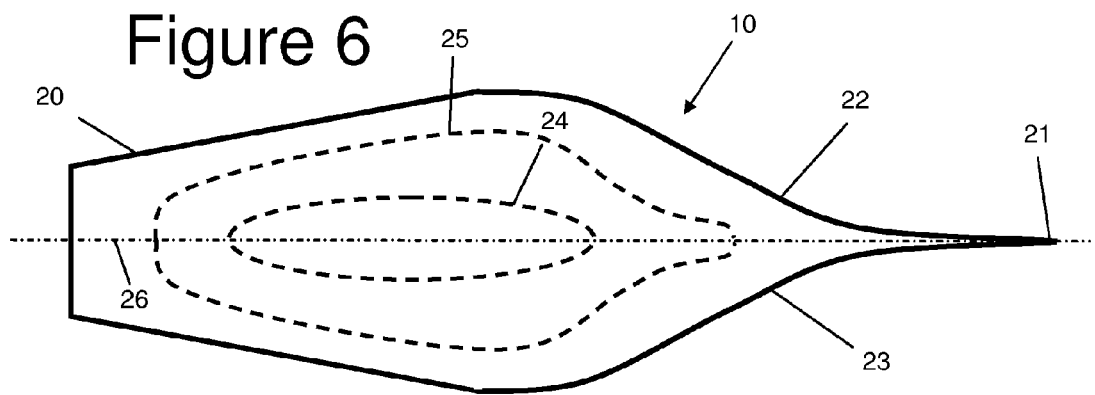
FIG. 6 is a plan view of one of the bumps showing a series of contour lines.

FIG. 5 is a lateral cross-section through the centre of one of the bumps 10, and FIG. 6 shows a series of plan-form contour lines (equivalent to contour lines in a map) including a footprint contour line in solid line where the shock bump merges into the upper surface of the wing; an intermediate contour line 25; and an upper contour line 24. The footprint contour line comprises a diverging nose 20 and a converging tail with concave opposite sides 22,23 which meet at a cusp-like point 21 at the trailing edge of the bump. The tail of the intermediate contour line 25 has a pair of concave sides which become convex and meet head-on at the trailing edge of the contour line 25. The shock bump 10 is laterally symmetric about its fore-and-aft centre line 26.

The detailed shape of each individual shock bump 10 can be adjusted from the shape illustrated such that at the "design" operating condition the flow over the bump is fully attached as shown in FIG. 1. When operated at higher Mach number or lift coefficient as shown in FIG. 3, some beneficial modification of the shock foot will take place in addition to the formation of a pair of longitudinal vortices.

Similar levels of buffet alleviation as achieved by VVG devices is anticipated and the concept could be applied to other aerodynamic structures such as turbine blades, nacelles, pylons, fins and tails.

In the embodiment of FIG. 1, the upper surface of the wing carries an array of shock bumps comprising a first series of shock bumps 3 with an elliptical footprint, and a second series of cusp-shaped shock bumps 10 positioned aft of the first series. However, various other embodiments fall within the scope of the invention, including:

- a single cusp-shaped shock bump
- a single series of cusp-shaped shock bumps (that is, with the elliptical shock bumps 3 omitted) in the same "on-design" position as the first series of shock bumps 3 in FIG. 1
- a single series of cusp-shaped shock bumps (that is, with the elliptical shock bumps 3 omitted) in the same "off-design" position as the second series of shock bumps 10 in FIG. 1
- an array of shock bumps comprising two series of cusp-shaped shock bumps in the same positions as the bumps 3, 10 in FIG. 1.

Figure 7:
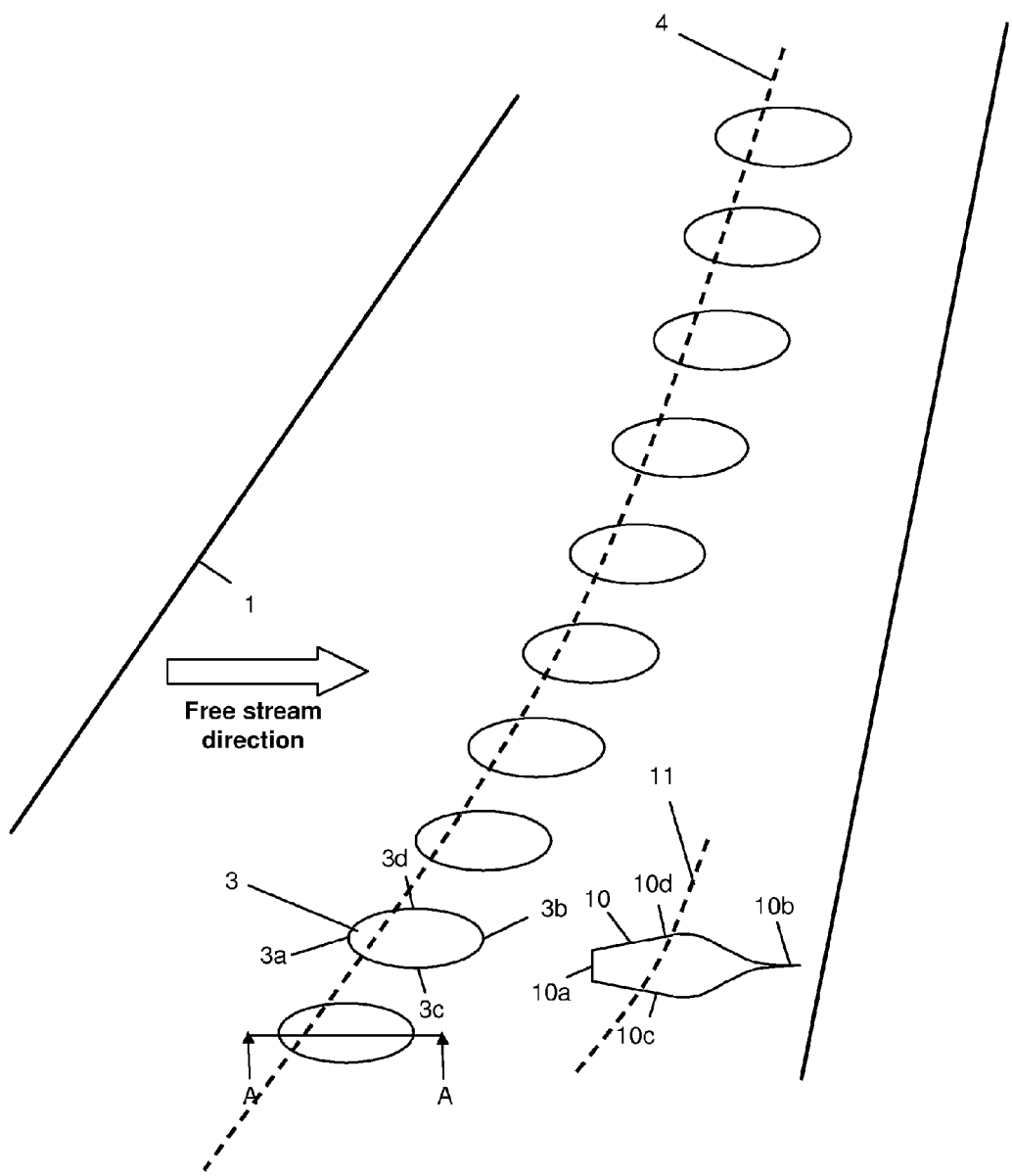
FIG. 7 is a plan view of the top of an aircraft wing carrying an array of shock bumps according to a second embodiment of the invention.

FIG. 7 is a plan view of the upper surface of an aircraft wing according to a second embodiment of the present invention. The embodiment of FIG. 7 is identical to the embodiment of FIG. 1, except in this case the forward series has ten shock bumps 3, whereas there is only a single rear shock bump 10. FIG. 10 shows the span-wise extent of the shocks 4, 11. It can be seen that the shock 4 extends over a significant span-wise portion of the wing, whereas the shock 11 is relatively short so only a small number of rear shock bumps 10 (in this case only one) is needed.

Although the invention has been described above with reference to one or more preferred embodiments, it will be appreciated that various changes or modifications may be made without departing from the scope of the invention as defined in the appended claims.

The invention claimed is:

1. A transonic airflow shock bump, said bump comprising a diverging nose and a converging tail, wherein the tail has at least one plan-form contour line with a pair of concave opposite sides, said shock bump is configured to cause detached air flow over said shock bump, said detached flow comprising a pair of longitudinal vortices.

2. The shock bump of claim 1 wherein the concave opposite sides of the plan-form contour line meet at a cusp.

3. The shock bump of claim 1 further comprising a leading edge, a trailing edge, an inboard edge and an outboard edge.

4. The shock bump of claim 1 wherein the shock bump has substantially no sharp convex edges or points.

5. An aerodynamic structure having a surface, said structure comprising at least one shock bump according to claim 1 extending from said surface.

6. The structure of claim 5, wherein said bump meets the surface at a leading edge of the bump, a trailing edge of the bump, an inboard edge of the bump and an outboard edge of the bump.

7. The structure according to claim 5 wherein the shock bump is configured to modify the structure of a transonic shock forming adjacent to the surface of the structure when the structure is moved through air at transonic speeds.

8. The structure of claim 7 wherein the shock bump is shaped and positioned so as to induce a smeared foot in the shock with a lambda wave pattern.

9. The structure of claim 5 wherein the aerodynamic structure is an aerofoil and the surface is a low pressure surface of the aerofoil.

10. The structure of claim 5 wherein the aerodynamic structure is an aerofoil having a leading edge and a trailing edge, and wherein said bump has an apex which is positioned towards the trailing edge of the aerofoil.

11. A method of operating a transonic aerodynamic structure, the structure comprising a surface and a shock bump extending from said surface, the method comprising:

a. operating the structure at a first condition in which an airflow over the shock bump is substantially fully attached; and b. operating the structure at a second condition in which a shock forms adjacent to the surface of the structure, the shock bump modifies the shock, and the airflow over the shock bump detaches and forms a pair of longitudinal vortices.

12. The method of claim 11 wherein the shock bump comprises a diverging nose and a converging tail, wherein the tail has at least one plan-form contour line with a pair of concave opposite sides.

13. The method of claim 11 wherein the second condition includes at least one of a higher flow speed and a higher lift coefficient than in the first condition.

14. The method according to claim 11 wherein the shock bump induces a smeared foot in the shock with a lambda wave pattern when the structure is operated at the second condition.

15. A method of operating a transonic aerodynamic structure having a surface, the structure comprising a shock bump extending from said surface, the shock bump having a diverging nose and a converging tail, the tail having at least one plan-form contour line with a pair of concave opposite sides, the method comprising operating the structure at a condition in which airflow over the surface forms a shock adjacent to the surface of the aerofoil, the shock bump modifies the structure of the shock, and airflow over the shock bump detaches and forms a pair of longitudinal vortices.

* * * * *